United States Patent [15] 3,674,918
Legler [45] July 4, 1972

[54] METHOD AND ARRANGEMENT FOR THE TRANSMISSION OF SYNCHRONIZING INFORMATION TO COLOR TELEVISION APPARATUS

[72] Inventor: Ernst Legler, Seeheim a. d., Germany

[73] Assignee: Fernseh GmbH, Darmstadt, Germany

[22] Filed: March 2, 1971

[21] Appl. No.: 120,371

Related U.S. Application Data

[63] Continuation of Ser. No. 780,368, Dec. 2, 1968, abandoned.

[30] Foreign Application Priority Data

Dec. 1, 1967 Germany ......................P 15 37 104.7

[52] U.S. Cl. ......................178/5.2 R, 178/5.4 P, 178/5.4 SY, 178/69.5 TV

[51] Int. Cl. ..........................................................H04n 9/44

[58] Field of Search ......................178/5.2, 5.4, 5.4 P, 5.4 SY, 178/6 R, 69.5 TV

[56] References Cited

UNITED STATES PATENTS

| | | | |
|---|---|---|---|
| 3,410,953 | 11/1968 | Quinlan | 178/6 R |
| 3,492,417 | 1/1970 | Scholz | 178/5.4 P |
| 3,504,115 | 3/1970 | Suzuki et al. | 178/69.5 TV |

*Primary Examiner*—Richard Murray

[57] ABSTRACT

A method and arrangement for the transmission of synchronizing information to color television apparatus, particularly when operated in accordance with the PAL (V-axis) color television system. The required synchronizing signals are all combined within one signal which is then transmitted over a single video transmission line to the color television apparatus. The four required synchronizing signals are the blanking signal, the sync signal, the registration pulse (burst gating pulse) of the color sync signal, and the color carrier signal. The blanking signal and the sync signal are added with identical polarity, whereas the registration pulse (burst gating pulse) of the color sync signal is added with opposite polarity and with equal amplitude. The blanking signal and the registration pulse (burst gating pulse) assume the identical amplitude region. The color carrier signal is added to the preceding sum after suppression of the color carrier frequency portions.

23 Claims, 15 Drawing Figures

Inventor:
ERNST LEGLER

By: Michael S. Striker
Attorney

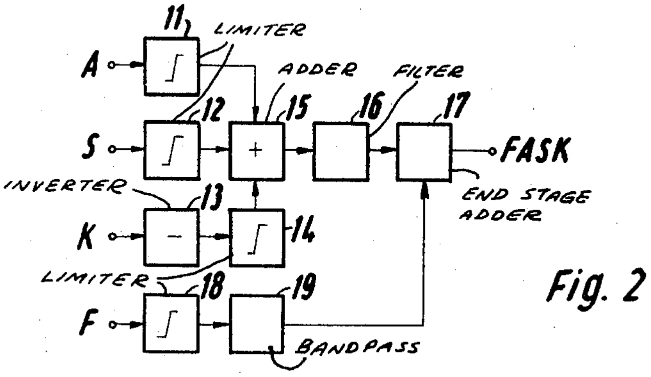
Fig. 2
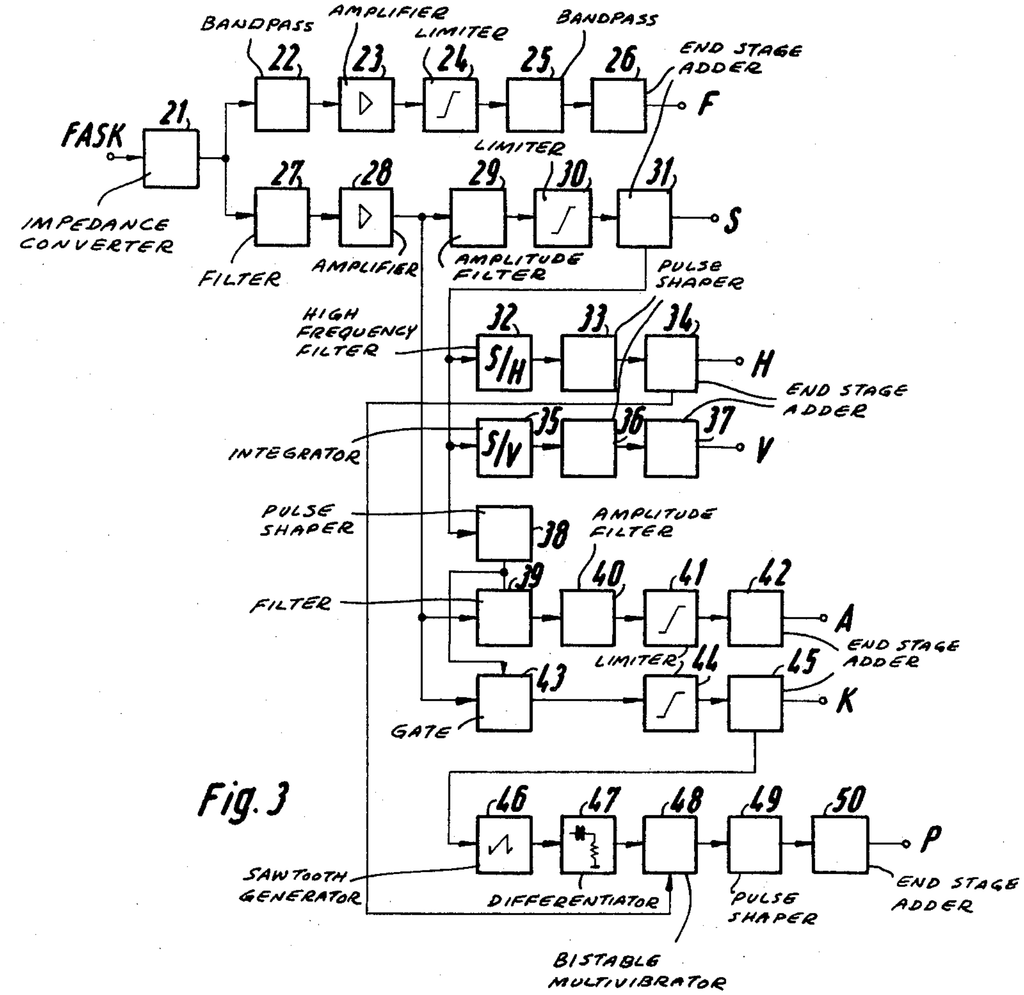
Inventor:
ERNST LEGLER
By: Michael S. Striker
Attorney Inventor:
ERNST LEGLER
By: Marcel S. Steiler
Attorney Inventor:
ERNST LEGLER
By: Michael S. Striker
Attorney Inventor:
ERNST LEGLER
By: Michael S. Striker
Attorney Inventor:
ERNST LEGLER
By: Michael S. Striker
Attorney

METHOD AND ARRANGEMENT FOR THE TRANSMISSION OF SYNCHRONIZING INFORMATION TO COLOR TELEVISION APPARATUS

This application is a continuation of application Ser. No. 780,368, filed Dec. 2, 1968, and now abandoned.

BACKGROUND OF THE INVENTION

The present invention resides in a process and arrangement for the transmission of synchronizing information to color television apparatus operated in accordance with the PAL or V-axis color television system. The method, in accordance with the present invention, is preferably used for the purpose of synchronizing the color television apparatus in a color television studio. The method is also applicable to synchronizing of color television studios of a color television studio complex or network from a central location.

In a color television studio equipped with color television apparatus operated in accordance with PAL or V-axis color television system, the synchronizing information which is required consists of the sync signal S, horizontal sync pulse H, vertical sync pulse V, as well as the blanking signal A. In addition to these synchronizing signals required in a television studio for black and white television, a color television studio equipped with color television apparatus operated in accordance with the PAL or V-axis color television system requires the supplementary information of the color carrier F, the identification or registration pulse for the color sync signal K, or gating pulse for the color sync signal K (burst registration pulse or burst gating pulse), and the PAL registration pulse P or V-axis switching pulse P.

These information signals are necessary for studios operated in accordance with the PAL or V-axis color television system.

Of these seven information signals, however, only four are required to be transmitted. This is based on the condition that the information for the horizontal and the vertical sync pulse is contained within the sync signal S, whereas the PAL registration pulse P or V-axis switching pulse P is contained within the registration pulse or gating pulse for the color sync signal K. Accordingly, four different synchronizing information signals must be transmitted in the form of the color carrier F, the blanking signal A, the sync signal S, and the registration pulse or gating pulse for the color sync signal K. The transmission of the synchronizing signals to a television studio and their distribution was, heretofore, accomplished through separate transmission lines preferably of the coaxial cable type. In a television studio for black and white, two synchronizing information signals must be transmitted. These are the sync signal and the blanking signal. In color television studios with color television apparatus operated in accordance with the PAL or V-axis color television system, however, four synchronizing information signals are required for synchronizing purposes. This implies that in place of two transmission networks, four transmission networks are now required for the transmission of these information signals. As a result, considerable equipment is required for equipping a new color television studio, as well as extending a black and white television studio to color adaptation in accordance with the PAL or V-axis color television system.

Accordingly, it is an object of the present invention to decrease the number of signals required to be transmitted for synchronizing information purposes, including the color carrier. It is the object of the present invention to apply this feature to a color television studio or a color television studio network complex.

The objects of the present invention are achieved through a method for transmitting synchronizing information to color television apparatus operated in accordance with the PAL or V-axis color television system, in which all required synchronizing signals are combined within one signal. This combined signal can then be transmitted over a single video transmission line.

The method in accordance with the present invention permits thereby a substantial decrease in the equipment required for transmitting the synchronizing information, in the form of transmission networks. This resides in the condition that only a single video transmission line is sufficient for transmitting the entire synchronizing information. Furthermore, even the subsequent adaptation of a television studio to color television becomes simplified through the method of the present invention. This is because no new synchronizing transmission lines must be laid. In addition, the additional synchronizing signals required for the color television apparatus operated in accordance with the PAL or V-axis color television system may be transmitted over the prevailing or available synchronizing transmission lines.

In the preferred use of the method of the present invention for synchronizing of color television studio network complexes from a central station or location, it is not necessary to take into account disturbances resulting from stray signals. In such application, the synchronizing information is transmitted over coaxial cable. Thus, it is sufficient, as aforementioned, to derive the information for the PAL switching phase (PAL registration pulse P) from the registration pulse for the color sync signal (burst registration pulse K or burst gating pulse K), and the sync signal.

In the event, however, it is necessary to take into account the appearance of disturbing signals when the synchronizing information is transmitted, the error resulting from a disturbing signal in the PAL switching phase, becomes first corrected in the subsequent vertical blanking gap. In such cases, however, a more rapid correction of the PAL switching phase is desired.

In accordance with a further embodiment of the present invention, the information for the PAL switch phase (PAL registration pulse P) is transmitted in each line period, in addition to the blanking signal A, the sync signal S, the registration pulse for the color sync signal (burst gating pulse K) and the color carrier F. The transmission of the information for the PAL switching phase is preferably carried out through modulation of the duration of the burst registration pulse (burst gating pulse K) for the color sync signal K.

In a preferred embodiment of the present invention, a combined signal is produced by adding with equal amplitude all of the required synchronizing signals such as the blanking signal A, the sync signal S with identical polarity and the registration pulse K (burst gating pulse K) of the color television signal with opposite polarity. The process is such that the blanking signal and the registration pulse assume the same amplitude region. The color carrier F is then added to this resulting summing signal, after suppression color carrier frequency portions.

Therefore, for the purpose of forming the combined synchronizing information, the pulse-shaped signals ASK are added with equal amplitudes, whereby the signals A and S are preferably of negative polarity and K is of positive polarity. The signals A and K lie then within the same amplitude region. This is of advantage for subsequent or later extraction or separation of the sync signal. The signal representing the sum ASK has preferably removed from it all color carrier frequency portions through a low-pass filter with a frequency limit of approximately 2 MHz and a band-rejection filter of, for example, 4.43 MHz at the color carrier frequency. The color carrier F is then added to the resulting signal.

The total amplitude of the combined signal formed in this manner, exhibits preferably the normalized or standardized value of, for example, one volt peak-to-peak for normalized or standardized terminal resistance of, for example, 75 ohms. The signal can then be treated as a color picture signal mixture (FPAS signal) with regard to distribution or division and attenuation. Each component, of which the combined signal is formed, is contained within this summing signal by one-third of the entire amplitude as, for example, 0.33 volts peak-to-peak. Thus, each such component contributed 0.33 volts peak-to-peak to the total amplitude. This is based on the condition, as described above, that the signals A and K assume equal amplitude regions. The combined signal formed in the aforementioned manner, has the advantage that the components contained within the signal may be separated from each other in a simple and reliable manner, after transmission of the signal over a single video transmission line.

SUMMARY OF THE INVENTION

A method and arrangement for the transmission of synchronizing information to color television apparatus operated in accordance with the PAL or V-axis color television system. The four synchronizing signals which are required, are all combined in a single signal and transmitted over a single video transmission line to the apparatus. To form this single combined signal, the blanking signal and the sync signal are added with equal or identical polarity, whereas the registration pulse of the color sync signal (burst gating pulse) is added with opposite polarity but of equal amplitude. The arrangement is such that the blanking signal and the registration pulse assume the same amplitude region. The resulting signal has applied to it additively the color carrier, after suppression of the color carrier frequency portions.

The novel features which are considered as characteristic for the invention are set forth in particular in the appended claims. The Invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a schematic block diagram for the formation of the combined synchronizing information corresponding to the FASK coder;

FIG. 3 is a schematic block diagram for the reconstruction of the synchronizing signals and the color carrier from the combined synchronizing information corresponding to the FASK decoder;

DESCRIPTION OF THE PREFERRED EMBODIMENTS

Figure 1:
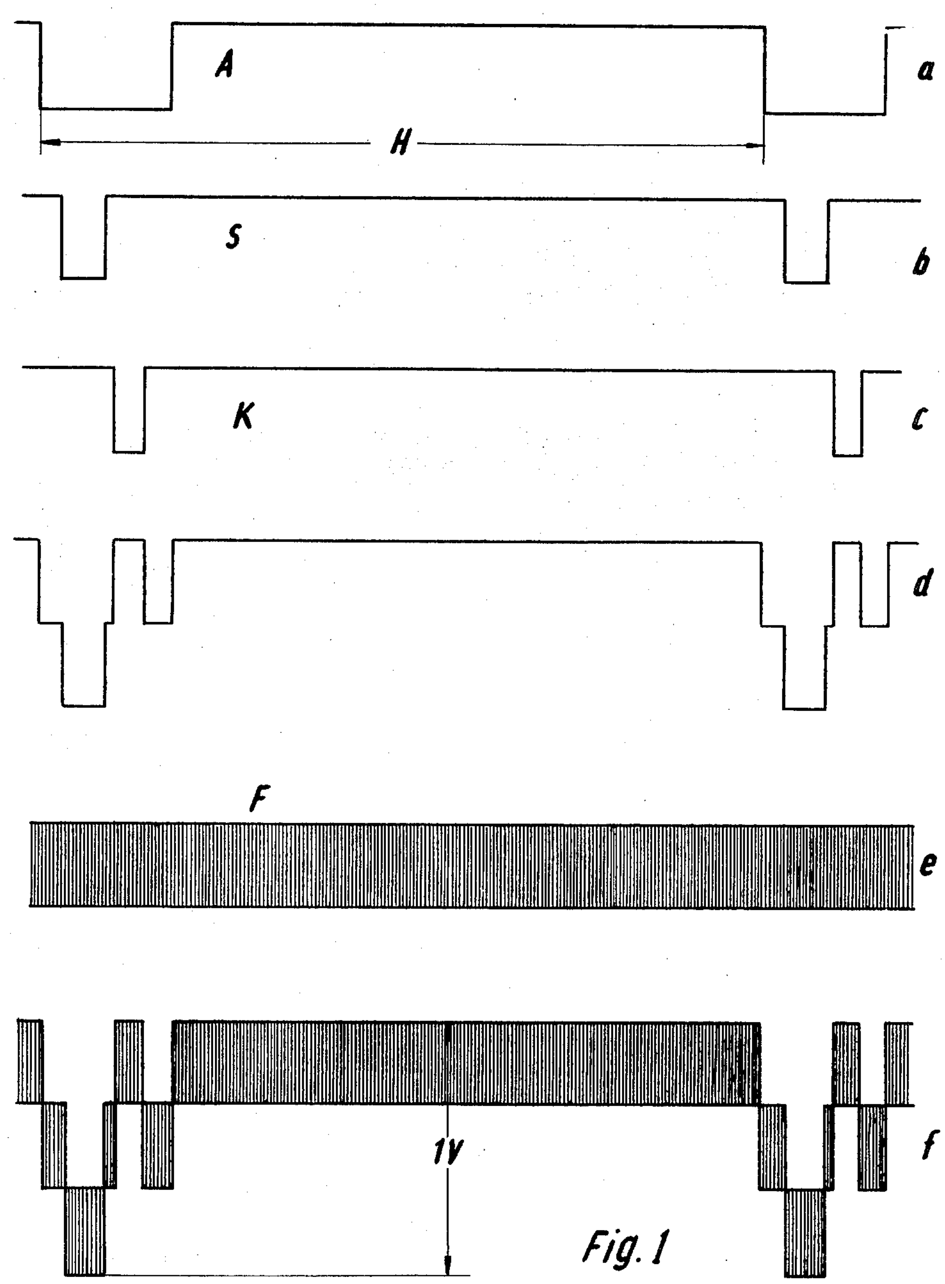
FIG. 1 is a timing diagram of the required synchronizing signals, including the color carrier, and the synchronizing information resulting after combination of synchronizing signals, in accordance with the present invention.

Referring to the drawing, and in particular to FIG. 1, waveform A is the horizontal blanking pulse of the blanking signal, waveform S is the horizontal sync pulse of the synchronizing signal, and waveform K is the burst gating pulse. Continuous oscillation of the color carrier is represented by the waveform F. For the purpose of examining the timing process, several magnitudes will be given with regard to European television systems with 625 lines. Thus, the line duration H is of the order of 64 microseconds, the blanking pulse A has a duration at the center of 12 microseconds and is within the range of 11.8 – 12.3 microseconds. The sync pulse S is approximately 1.5 microseconds after the beginning of the blanking pulse, and has a width of 4.7 microseconds from the center. The color burst gating pulse K which determines the state and duration of the color sync signal, begin 5.5 microseconds after the front edge of the sync pulse S, and has a duration of approximately 2.26 microseconds. The color carrier oscillation F has, in this example, a frequency of approximately 4.43 MHz. The pulse-shaped signals A, S and K are normally of negative polarity.

For the purpose of forming the combined synchronizing information, in accordance with the present invention, the blanking pulse A and the horizontal sync pulse S are added, while retaining the polarity. After reversal of the polarity of the pulse K from negative to positive polarity, the positive pulse K is also added to the two signals A and S. As a result, the combined signal shown in FIG. 1*d* is realized. The color carrier F is added to this signal of FIG. 1*d* after passing through a bandpass filter. The final resulting signal is shown in FIG. 1*f*, and contains the information for the blanking signal, the sync signal, the burst gating pulse, and the color carrier frequency. This signal is from here on in designated as FASK signal.

In the description of the formation of the combined synchronizing information, it was established that the amplitudes of all the signals to be combined, be of equal magnitude. This magnitude is, for example, 0.33 volts peak-to-peak, and applies to the signals A, S, K, and F. In this manner, the total amplitude of the combined signals has the nominal value of 1 volt peak-to-peak.

For the purpose of forming the combined signal FASK, the arrangement shown in block form in FIG. 2, may be used. In this arrangement, the blanking signal A and the sync signal S are passed through amplitude limiters 11 and 12, respectively. These limiters are operative on both sides and limit the amplitudes of the applied signals to the desired magnitude of, for example, 0.33 volts. The pulse K is then reversed in polarity by applying it to an inverting stage 13. With this reversal in polarity, the pulse K corresponds to the pulses A and S, in polarity. A further amplitude limiter 14, operative on both sides, is connected to the output of the inverting stage 13, and also limits the magnitude of the pulse K to, for example, 0.33 volts peak-to-peak. The amplitude limited pulses A and S with, for example, negative polarity, and the amplitude limited pulse K with positive polarity, are all added within an adding stage 15. The filter 16 connected to the output of the adding stage 15 ascertains that the combined pulse-shaped signal reaches the end stage 17 of the arrangement. The filter 16, for example, is in the form of a bandpass filter for the color carrier frequency of 4.43 MHz. At the same time, the filter may be a low-pass unit free from overshoots and with a limiting frequency of approximately 2 MHz and a cutoff point at the color carrier frequency. The color carrier is finally added to the signals A, S and K, in the end stage 17. In this addition process, the color carrier signal is added with the same amplitude as the signals A, S and K. In order to assure that this amplitude is retained, the color carrier F can be subjected, similarly, to a two-sided amplitude limiting in the arrangement 18. The color carrier oscillation limited on both sides can then be made sinusoidal again through the bandpass filter 19.

The combined synchronizing information of FIG. 1f, may be realized through, for example, the arrangement described in conjunction with fig. 2. This combined synchronizing information may be transmitted over a single transmission line adapted to television signals, and this transmission of the synchronizing information is similar or analogous to the transmission of a television signal. In practice, the combined synchronizing information is generated in a central location and transmitted to the color picture signal generators and their associated PAL or V-axis coders, as well as other color television apparatus for television studios. This transmission from the central location is accomplished through video transmission lines as, for example, coaxial cable.

The combined synchronizing information, which is formed or produced in accordance with the present invention, permits the information to be separated, in a simple manner, into its components, after transmission. This process may be carried out with operational reliability. FIG. 3 shows the arrangement, in block form, for carrying out the process by which the components are reproduced or derived from the combined synchronizing information. FIG. 3 is an embodiment of such an arrangement. The arriving combined synchronizing information FASK is applied to an impedance converter 21, the output of which is a low impedance or low ohmic signal source. After passing through the impedance converter 21, the signal is frequency divided or frequency separated. The output of the impedance converter 21 is applied to a bandpass filter 22 which filters the color carrier frequency portion from the combined signal. The resulting color carrier F appearing at the output of the bandpass filter 22, is amplified in the amplifier 23 and applied to the two-sided amplitude limiter 24. The latter limits a signal to the desired amplitude.

The bandpass filter 25 connected to the output of the limiter 24, converts again the color carrier oscillation into sinusoidal form, and after passing through the end stage 26, the color carrier signal F is available for further use.

In the other signal processing path, the combined synchronizing information is applied to a band-rejection filter 27, and is freed thereby from the color carrier. The remaining pulse-shaped signal ASK is amplified through the amplifier 28 connected to the output of the band-rejection filter 27. The sync pulse S assumes a different amplitude region from the blanking pulse A and the registration pulse, identification pulse, or registration pulse K. This sync signal S may be separated from the combined signal ASK, in a conventional manner, through an amplitude filter 29. After passing through the amplitude limiter 30 connected to the output of the amplitude filter 29, the sync signal S is available at the output of the end stage 31. The latter is connected to the amplitude limiter circuit 30.

The sync signal S is applied, in the conventional manner, to a high-frequency filter 32 which is connected in series with a subsequent pulse shaper 33 and the end stage 34. From this series combination, the horizontal sync pulse H is realized in the usual manner. The sync pulse S is also applied to a dividing stage 35 which integrates the sync signal in the conventional manner. The output of the circuit 35 is applied to a pulse shaper 36, which in turn is connected in series with an end stage 37. The vertical sync signal V may be taken from the output of this end stage 37. The stages 32 to 37 may be omitted when their functions are included in the picture or video generators.

The pulse shaper 38 to which the sync signal S is also applied, forms a sampling pulse which prevails on both sides of the identification or registration pulse K. The output of the pulse shaper 38, representing the sampling pulse, is applied to a stage 39 for the purpose of reconstructing the blanking pulse A from the pulse combination ASK. The sync pulse is separated from the remaining pulse signal AS in the following amplitude filter 40 connected to the stage 39. After limiting the thus-realized blanking pulse within the stage 41, the blanking pulse A is made available at the output of the end stage 42 which is also an amplifying stage.

To reconstruct the identification pulse or registration pulse K from the pulse signal or pulse mixture ASK, the sampling pulse realized from the stage 38 is applied to a gate circuit 43. This gate circuit thereby transmits only the K pulse. After limiting both sides of the K pulse through the amplitude limiter 44, connected in series with the gate 43, the K pulse is made available at the output of the end stage 45 which is, in turn, connected to the output of the limiter 44.

To realize the PAL identification pulse P or V-axis switching pulse P from the burst identification pulse K or burst gating pulse K for the color sync signal, a saw-toothed-shaped signal is produced from the K pulse, through means of the stage 46. Thus, the latter stage 46 is a saw-tooth generator. The saw-tooth signal emitted by the generator 46 is differentiated by the differentiated circuit 47, and applied to a bistable multivibrator circuit 48. Thus, the resulting spike-shaped pulses aid in synchronizing the bistable multivibrator which also receives the horizontal frequency sync pulse from the stage 34. From the H pulses, the bistable multivibrator provides a pulse train having half the frequency of the H frequency. This pulse train from the bistable multivibrator is applied to a pulse shaper 49 which derives or shapes the P pulse and provides this signal at the output of the end stage 50 for further use, such as synchronizing the PAL switching phase or V-axis switching phase. The stages 46 to 50 can be omitted when their functions are included within the coders.

Figure 4:
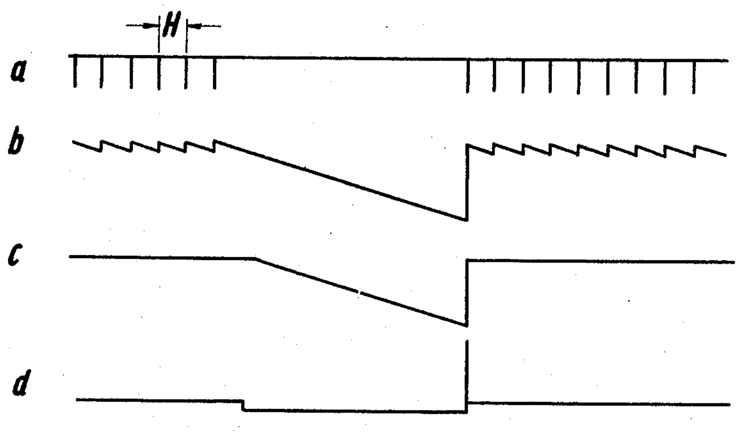
FIG. 4 is a timing diagram of the marking pulse for positive switching phase from the registration pulse.

To facilitate understanding of the function of the stages 46 and 47, a timing diagram is provided in FIG. 4. FIG. **4*a* shows the train of K pulses in the vicinity of the vertical blanking impulse, in which no K pulses appear. Through the periodic occurrence of the K pulse outside of the vertical blanking time intervals, the amplitudes of the saw-tooth oscillations produced by the stage 46, attain only very small magnitudes. This is due to the condition that the rise of the saw-tooth is steadily interrupted through the pulse following a line duration. During the vertical blanking time interval, however, in which no K pulses appear, the amplitude of the saw-tooth can rise to a substantially larger value, as shown in FIG. 4*b*. Saw-tooth oscillations of small amplitude appearing during the line period outside of the vertical blanking time interval are cut off, as shown in FIG. 4*c*. In this manner only saw-tooth oscillations of large amplitude remain during the vertical blanking time intervals. By differentiating the saw-tooth oscillations, pulses are realized from the short edges of these oscillations, which degenerate upon the appearance of the first K pulse after the vertical blanking impulse, as shown in FIG. 4*d*. The bistable multivibrator 48** becomes actuated with these pulses.

Figure 5:
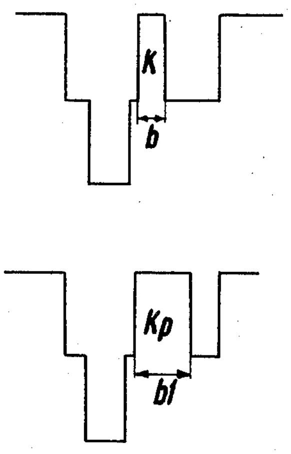
FIG. 5 is a timing diagram of the synchronizing information in which the registration pulse for the color sync signal, corresponding to the burst gating pulse K, has a different pulse width in each second line period than in the remaining line periods.

FIG. 5 shows the combined signal, without the color carrier F, in the line gap in which the information for the PAL identification pulse P or V-axis switching pulse P is also transmitted in every line period, in accordance with the present invention. In every second line period as for example, in all even-numbered line periods, the burst identification pulse K or burst gating pulse K becomes transmitted with normal width *b*. In all the line periods lying between those as, for example, the odd-numbered line periods, a border pulse $K_P$ is transmitted. The front edge of this pulse $K_P$ coincides in time with the front edge of the burst identification pulse K or burst gating pulse K. The back edge of this pulse K, however, occurs within the gap between the back edge of the normalized registration pulse K or gating pulse K and the back edge of the blanking pulse A. This back edge of the broader pulse $K_P$ lies preferably somewhat at the center of this gap, and the width $b_1$ is of the order of 1.6*b*, where *b* is the width of the normalized or standard registration pulse K or gating pulse K.

Figure 6:
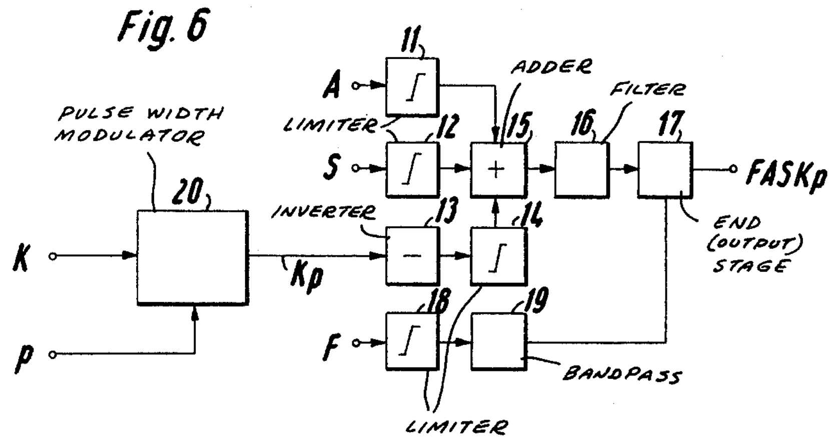
FIG. 6 is a schematic block diagram for the formation of the synchronizing information in accordance with the arrangement of FIG. 5.

FIG. 6 shows schematically, in block form, an arrangement for forming the combined synchronizing information including the PAL identification or registration pulse P or V-axis switching pulse P. The arrangement corresponds to that described in FIG. 2 with the exception that in place of the burst registration pulse K or burst gating pulse K, the pulse $K_P$ is applied to the stage 13. This latter pulse $K_P$ is a broader modulated pulse derived from the PAL registration pulse P or V-axis switching pulse P. Thus, through the pulse width modulator 20, the pulse $K_P$ is formed from the burst pulse K and the PAL registration pulse P or V-axis switching pulse P.

Figure 7:
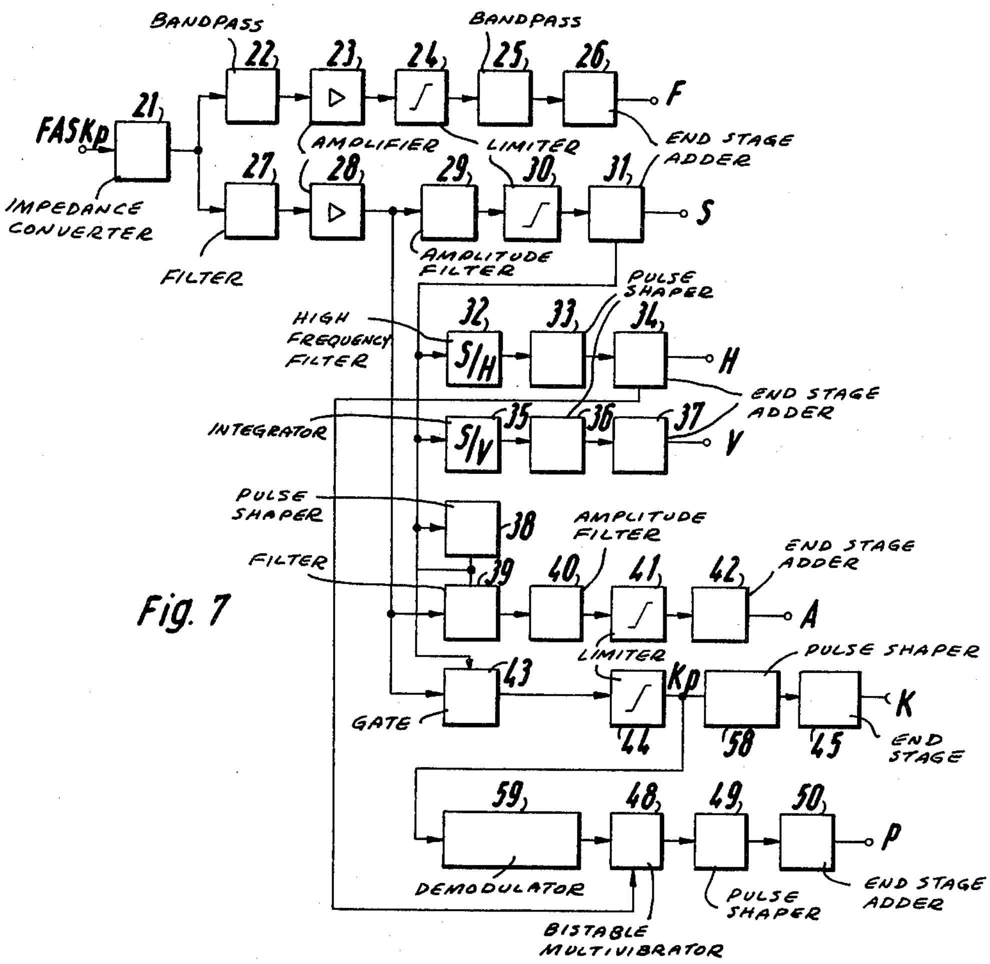
FIG. 7 is a block diagram of an arrangement for reconstructing the synchronizing signals including the PAL registration pulse P (V-axis switching pulse P), from the combined signal in accordance with FIG. 5.

FIG. 7 shows an arrangement for reconstructing the synchronizing signals from the combined synchronizing information $FASK_P$ which appears at the output of FIG. 6. This arrangement corresponds largely to the arrangement of FIG. 3 with the exception that in addition to the signals F, S, H, V, A and K the PAL registration pulse P or V-axis switching pulse P can also be obtained directly in each line period. In this arrangement the pulse width modulated signal $K_P$ appearing at the output of the limiter 44, is applied to a pulse shaper 58 which derives the burst pulse K of standard width, and this standardized or normalized pulse K is thereby reconstructed and available at the output of the end stage 45. The modulated pulse $K_P$ is also applied to a pulse width demodulator 59 connected in series with the bistable multivibrator 48. With the aid of this bistable multivibrator, the demodulator 59 delivers a PAL registration pulse P or V-axis switching pulse P during each second line period. Through a further pulse shaper 49 connected to the output of the bistable multivibrator 48, this pulse P is reconstructed to its standard or normalized shape and is taken from the output of the end stage amplifier 50.

Figure 8:
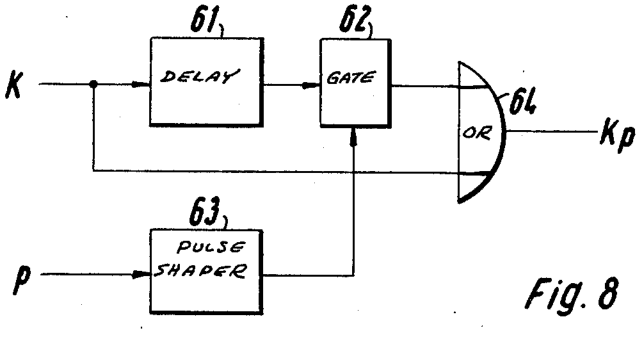
FIG. 8 is a schematic block diagram illustrating the principle for producing a burst registration pulse K (burst gating pulse K) modulated in pulse width by the PAL registration pulse P (V-axis switching pulse P)
Figure 9:
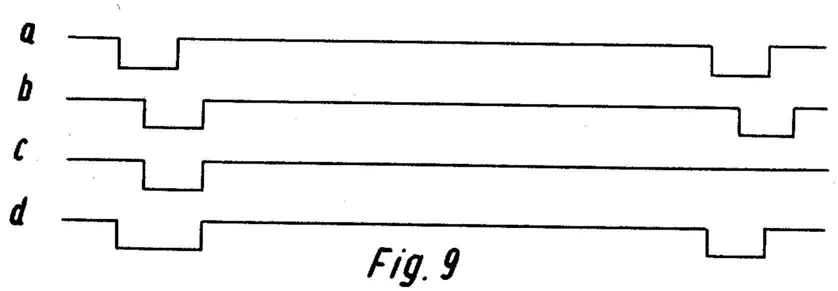
FIG. 9 is a timing diagram of the circuit arrangement of FIG. 8, and shows the waveforms of the pulse signals prevailing within that arrangement.

FIG. 8 shows schematically an embodiment of an arrangement for the pulse width modulation of the burst registration pulse K or burst gating pulse K with the PAL registration pulse P or V-axis switching pulse P. For the purpose of clarifying the operation of this arrangement, FIG. 9 shows a timing diagram of the waveforms appearing in this arrangement of FIG. 8.

The burst burst registration pulse K or burst gating pulse K becomes delayed within a delay stage 61 by approximately 60 percent of its width. This condition is illustrated in FIG. 9b. The delayed pulse is applied to a gate circuit 62 to which a gating signal derived from the pulse shaper 63 is applied. This gating signal is realized by applying the burst registration pulse K or burst gating pulse K to a gating pulse shaper 63. The gating pulse or gating signal allows the gate 62 to transmit the delay signal only in each second line period. The gated signal from the gate 62 is applied to one input of an OR circuit 64. The other input to this OR circuit is derived directly from the undelayed pulse K. The gate thereby delivers alternating pulses of different width $K_P$ in successive line periods, as shown in FIG. 9a or 9b.

FIGS. 10 to 13 show two embodiments for the reconstruction of the PAL registration pulse P or V-axis switching pulse P from the pulse width modulated signal $K_P$. These figures include the timing diagrams of the signal waveforms associated with these embodiments, particularly the pulse width modulator 59 in FIG. 7.

Figure 10:
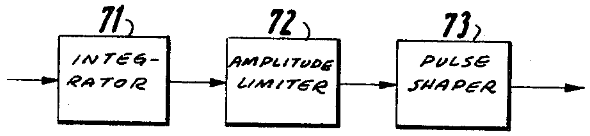
FIG. 10 is a block diagram of an arrangement for reconstructing the PAL registration pulse P (V-axis switching pulse P) from the pulse width modulated burst registration pulse K (burst gating pulse K)
Figure 11:
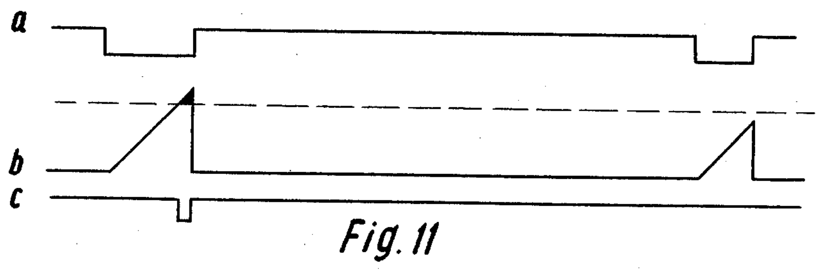
FIG. 11 is a timing diagram of the circuit arrangement of FIG. 10, and illustrates the waveforms of the signals prevailing within this arrangement.

In FIG. 10, the pulse width modulated signal $K_P$ is applied to an integrating circuit 71. Through this circuit a linear rising voltage is realized through the pulse $K_P$ as, for example, from charging a capacitor. This linear rising voltage is terminated through the back edge of the pulse $K_P$. This saw-tooth voltage attains thereby a higher amplitude with the pulse $K_P$ of greater width, than with the pulse $K_P$ of narrower width. Through an amplitude filter 72, the saw-tooth voltages from the pulse of smaller width may be suppressed. As a result, the voltage peaks of larger amplitude appear at the output of the amplitude filter 72 in every second line period. This is shown by the timing diagram of FIG. 11b. The triangular-shaped pulses are finally converted to rectangular-shaped pulses within the pulse shaper 73, corresponding to FIG. 11c.

Figure 12:
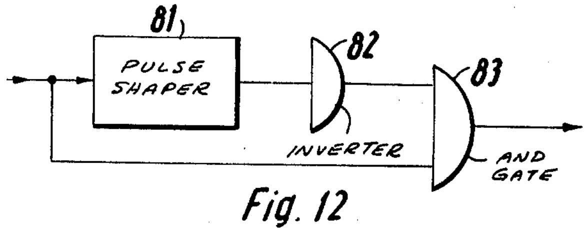
FIG. 12 is a further schematic block diagram of a further embodiment for reconstructing the PAL registration pulse P (V-axis switching pulse P) from the pulse width modulated burst registration pulse K (burst gating pulse K)
Figure 13:
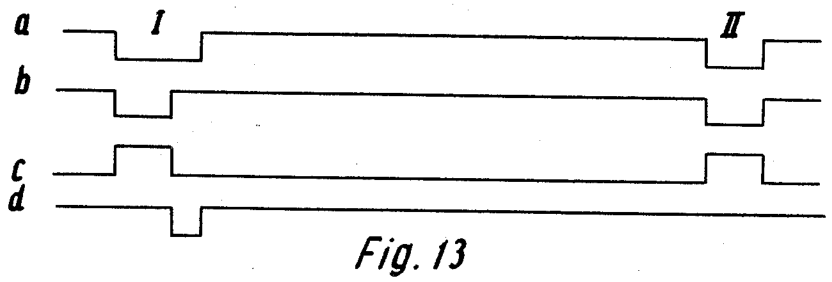
FIG. 13 is a timing diagram as shows the waveforms of the pulse signals associated with the arrangement of FIG. 12.

FIG. 12 shows another embodiment for demodulating the pulse $K_P$. In this embodiment, the latter is applied to a pulse shaper 81 which produces the width I and II of the standardized pulse K, as shown in FIG. 13b. The output of the pulse shaper 81 is applied to an inverter stage 82 which reverses the polarity of the applied signal. As a result, the negative polarity of FIG. 13b, for example, is reversed to the positive polarity shown in FIG. 13c. This pulse signal of FIG. 13c and the originally pulse width modulated signal $K_P$ are applied to an AND gate 83. In those line periods in which the pulse $K_P$ exhibits a larger width than, for example, 1.6 of the standardized pulse duration, shown by I in FIG. 13a, this pulse $K_P$ becomes compensated only during this time. This compensation is performed in the AND gate 83 through the pulse of FIG. 13c with pulse duration which is 1.2 that of the standardized value. After the end of the pulse of FIG. 13c, only a portion of the broader pulse of FIG. 13a prevails, and an output pulse is delivered as shown in FIG. 13d. In the line periods in which the pulse $K_P$ exhibits the normalized or standardized width, this pulse becomes fully compensated through the somewhat broader pulse of FIG. 13c. Under this condition, the AND gate does not deliver any output signal.

The illustrated figures for the pulse width modulation and demodulation should be considered only from the viewpoint of being exemplary. The modulation and demodulation can be accomplished also through other means which are available to the practitioner in the art.

Figure 14:
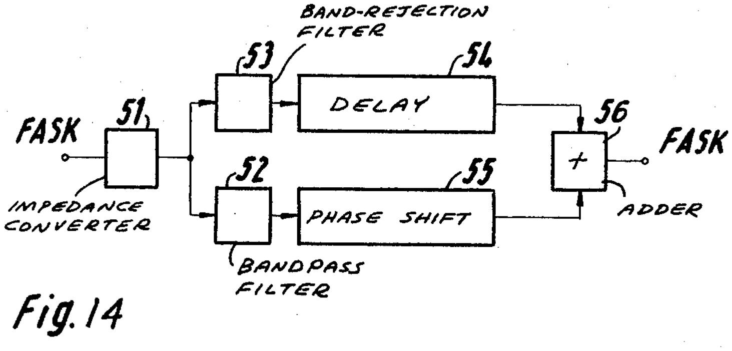
FIG. 14 is a block diagram of an arrangement for compensating the synchronizing signals against transmission time intervals, and for setting the phase of the color carrier.

To compensate the sync pulse for the transmission time depending upon the length of the transmission line, compensation is required to produce precise synchroism among all the different signals from the video generators and coders as well as the central location. In the conventional and separate transmission of the individual pulses, heretofore, it was required to provide each pulse with a separate delay arrangement having a variable delay time. Even in this aspect the process of the present invention, has essentially the advantage that only a single delay arrangement with adjustable delay is required for the combined synchronizing information. This condition is schematically illustrated in FIG. 14. The combined synchronizing information FASK is applied to an impedance converter 51 which has a low impedance or low ohmic output. This output from the impedance converter 51 is applied to a bandpass filter 52 for the color carrier frequency. This stage 52 separates or extracts the color carrier from the combined synchronizing information. In a parallel circuit, the output of the impedance converter 51 is also applied to a band-rejection filter 53 through the color carrier is separated or extracted from the combined signal. The mixed pulse signal ASK is applied to a delay circuit 54 having adjustable delay. The color carrier F can be adjusted or set to the correct phase, through a variable phase shifter having a region of zero to 360° of the color carrier phase. The delayed pulse signal ASK and the color carrier which is set to the correct phase, can again be added in a stage 56. At the output of this adding stage 56, a combined synchronizing information is made again available. At this circuit point, the combined synchronizing information has the correct pulse timing and the correct phase of the color carriers.

Figure 15:
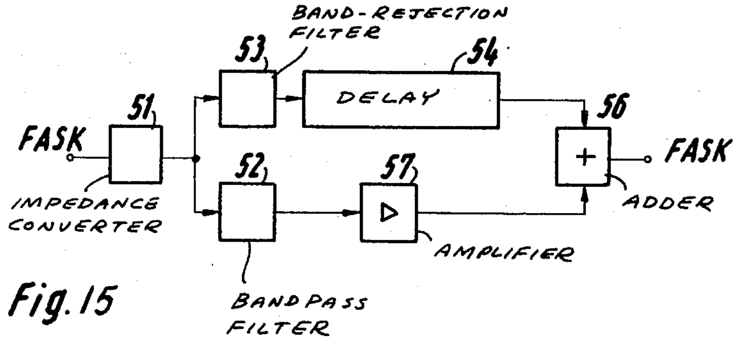
FIG. 15 is a block diagram of an arrangement similar to that of FIG. 5 without phase adjustment for the color carrier.

In the case in which the phase of the color carriers can be set in the PAL coder connecting to arrangement, the variable phase shifter 55 may be omitted. At the same time, the delay arrangement of FIG. 15 can be of correspondingly simpler design and construction. An amplifier 57 for the color carrier is provided in addition to the filter 52, in the color carrier channel shown in FIG. 15.

It will be understood that each of the elements described above, or two or more together, may also find a useful application in other types of constructions differing from the types described above.

While the invention has been illustrated and described as embodied in arrangements for transmitting synchronizing information in color television systems, it is not intended to be limited to the details shown, since various modifications and structural changes may be made without departing in any way from the spirit of the present invention.

What is claimed as new and desired to be protected by Letters Patent is set forth in the appended claims;

1. A method for the transmission of synchronizing information to color television apparatus in broadcasting studios comprising the steps of forming as many synchronizing signals as are required for synchronizing the operation of said apparatus; combining into one signal the required synchronizing signals to form thereby a single combined signal; transmitting said single combined signal and only said combined signal over a single video transmission channel to said color television apparatus; and recovering from said combined signal the component synchronizing signals thereof.

2. The method for the transmission of synchronizing information as defined in claim 1, wherein the step of combining into one signal the required synchronizing signals comprises adding the blanking signal and the sync signal with identical polarity, and adding the burst gating pulse of the color sync signal with opposite polarity, said adding step providing a sum signal; suppressing the color carrier frequency portion of the color carrier signal; and adding the color carrier signal to said sum signal after suppression of the color carrier frequency portion.

3. The method for the transmission of synchronizing information as defined in claim 2 wherein said blanking and said sync signal are of negative polarity and said burst gating pulse is of positive polarity.

4. The method for the transmission of synchronizing information as defined in claim 3 wherein the sum of the amplitudes of the components within the combined signal has a normalized value of 1 volt peak-to-peak for a normalized resistance of substantially 75 ohms.

5. The method for the transmission of synchronizing information as defined in claim 1, including the step, before said adding step, of limiting the blanking signal, the sync signal, the burst gating pulse, and the color carrier signal so that all have equal amplitudes, whereby the blanking signal and the burst gating pulse occupy the same amplitude range.

6. The method for the transmission of synchronizing information as defined in claim 1 including the step of removing the color carrier frequency portions in said combined signal.

7. The method for the transmission of synchronizing information as defined in claim 1 including the step of transmitting said combined signal from a central location to said apparatus over a transmission channel adapted to the transmission of video signals.

8. The method for the transmission of synchronizing information as defined in claim 1 including the step of transmitting in each line period information for the V-axis switching phase, said color television apparatus being operated in accordance with the V-axis color television system.

9. The method for the transmission of synchronizing information as defined in claim 8 including the step of modulating the duration of the burst gating pulse for the color sync signal for transmitting the information for said V-axis switching phase.

10. The method for the transmission of synchronizing information as defined in claim 9 including the step of shifting the trailing edge of the burst gating pulse for the color sync signal in each second line period wherein the V-axis switching pulse appears, said shifting being in the gap between the end of the normalized burst gating pulse and the end of the blanking pulse.

11. The method for the transmission of synchronizing information as defined in claim 9 including the step of transmitting alternately a burst gating pulse of normalized duration and a pulse with longer duration in successive line periods.

12. The method for the transmission of synchronizing information as defined in claim 9 including the step of delaying burst gating pulse for the color sync signal; and comparing the delayed burst gating pulse for said color sync signal with the undelayed burst gating pulse for the color sync signal.

13. The method for the transmission of synchronizing information as defined in claim 9 including the step of integrating the pulse width modulated pulse for reconstructing the V-axis switching pulse; removing triangular-shaped voltage spikes formed from said pulse width modulated V-axis switching pulse; and converting said triangular-shaped voltage spikes into rectangular pulses.

14. The method for the transmission of synchronizing information as defined in claim 9 including the step of lengthening the duration of the pulse width modulated V-axis switching pulse for reconstructing the V-axis switching pulse; reversing the polarity of the lengthened pulse; and comparing said inverted and lengthened pulse with said pulse width modulated V-axis switching pulse when in the unlengthened and non-inverted state.

15. The method for the transmission of synchronizing information as defined in claim 1 including the step of extracting the color carrier signal from said combined signal; and delaying with variable delay the signal from which said color carrier signal has been extracted.

16. The method for the transmission of synchronizing information as defined in claim 15 including the step of correcting the phase of said color carrier; and adding the phase-corrected color carrier to said signal delayed with variable delay.

17. A method for the transmission of synchronizing information as defined in claim 1, wherein the step of combining into one signal the required synchronizing signals comprises adding together the blanking signal, the sync signal, the burst gating pulse, and the color carrier signal to form a single combined signal.

18. An arrangement for the transmission of synchronizing information to color television apparatus comprising, in combination, adding means for adding together the blanking signal, the sync signal of said synchronizing information, the burst gating pulse of the color sync signal, said burst gating pulse being part of said synchronizing information, and the color carrier signal, for producing a single combined signal containing the information of said blanking signal, said sync signal, said burst gating pulse, and said color carrier signal; and a single video transmission channel for transmitting said combined signal and only said combined signal to said television apparatus.

19. The arrangement for the transmission of synchronizing information to color television apparatus as defined in claim 18 wherein said blanking signal and said sync signal are of negative polarity and said burst gating pulse is of positive polarity.

20. The arrangement for the transmission of synchronizing information to color television apparatus as defined in claim 19 including means for limiting the amplitude of said blanking signal, said sync signal and said burst gating pulse for the color synchronizing signal and the color carrier signal each to the average of the normalized value of the video signal.

21. The arrangement for the transmission of synchronizing information to color television apparatus as defined in claim 18 including reconstructing means for reconstructing the synchronizing information from said single combined signal, said reconstructing means comprising frequency discriminating means for separating said color carrier signal from the remaining components of said synchronizing information; amplitude discriminating means for separating said sync signal from said blanking signal and said burst gating pulse; and time discriminating means for separating said blanking signal and said burst gating pulse.

22. The arrangement for the transmission of synchronizing information to color television apparatus as defined in claim 21 wherein said time discriminating means comprises pulse shaping means for generating a gating pulse through the reconstructed sync signal means for extracting said burst gating pulse from said combined signal through said gating pulse generated by said pulse shaping means; and gate means for deriving said burst gating pulse from said combined signal when said gating pulse generated by said pulse shaping means is applied to said gate means.

23. The arrangement for the transmission of synchronizing information to color television apparatus as defined in claim 18, wherein said adding means comprises a first adder for adding said blanking signal and said burst gating pulse to said sync signal to produce a combination signal, and a second adder for adding to said combination signal said color carrier signal, whereby to produce said combined signal.

* * * * *